Oct. 31, 1933.　　　　B. G. JOHNSON　　　　1,932,786
FOUR-WHEEL DRIVE FOR AUTOMOBILES
Filed June 4, 1932　　　2 Sheets-Sheet 2
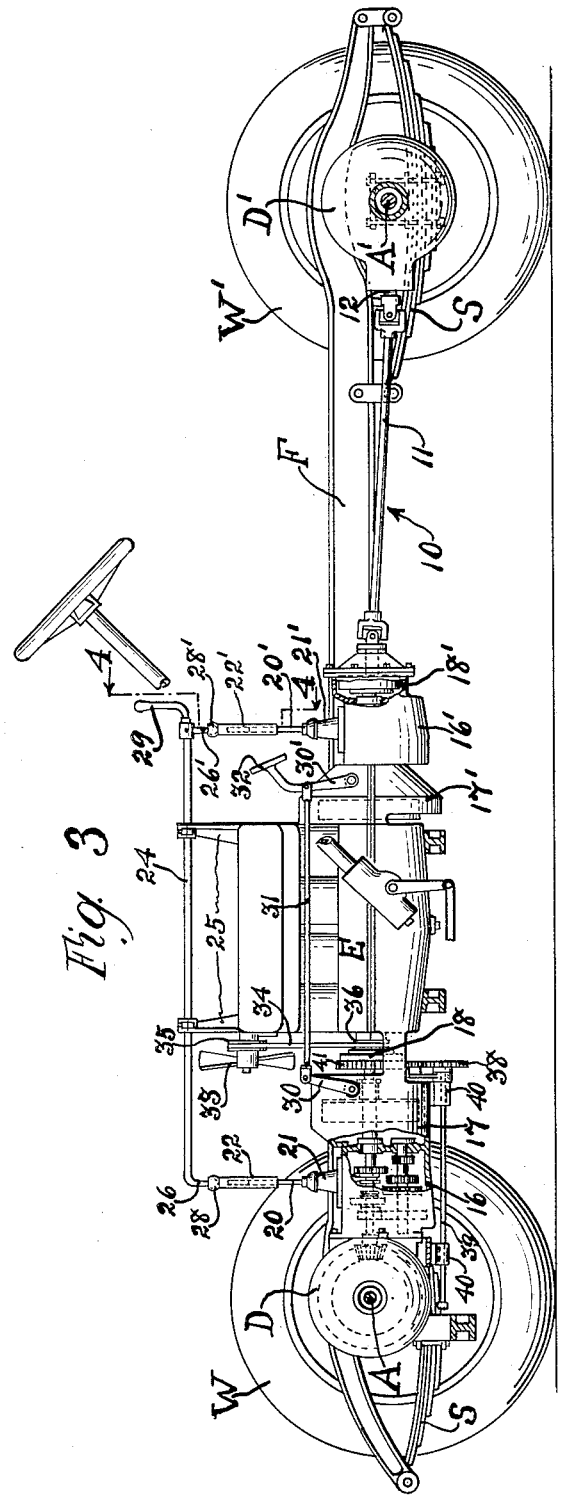
Inventor
Bror G. Johnson
by J. Daniel Stuwe
Attorney.

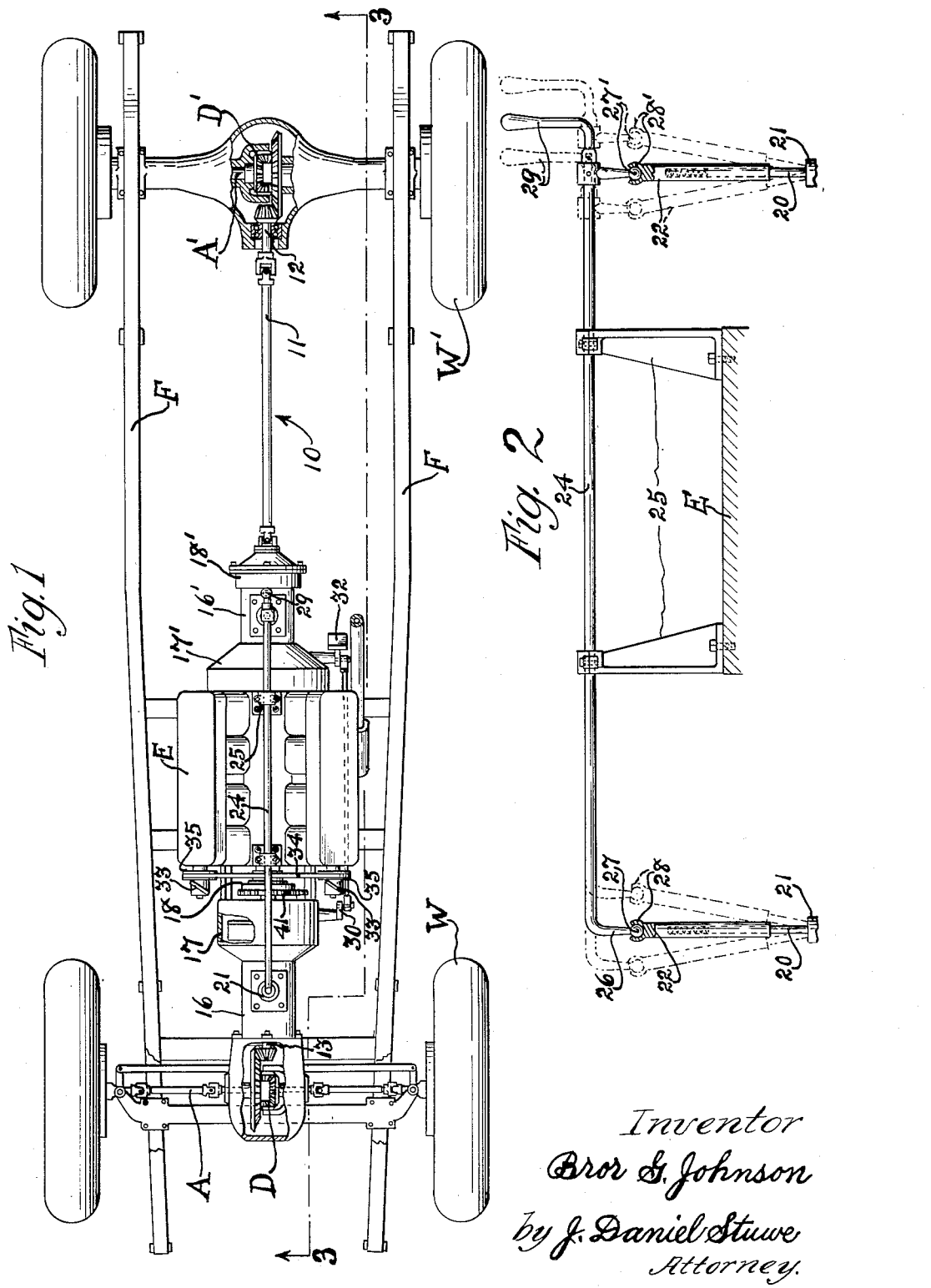

Patented Oct. 31, 1933

1,932,786

UNITED STATES PATENT OFFICE 1,932,786

FOUR-WHEEL DRIVE FOR AUTOMOBILES

Bror G. Johnson, Chicago, Ill.

Application June 4, 1932. Serial No. 615,290

6 Claims. (Cl. 180—44)

This invention relates to improvements in a four wheel drive for automobiles.

One of the main objects of this invention is to provide an improved mechanical four wheel driving means for an automobile and similar motor vehicles, wherein the entire driving mechanism operates through one main line shaft means, which has all its shaft parts alined and has its front and rear ends connected to the front and rear differentials for operating the same.

Another object is to provide a four wheel driving mechanism comprising an alined drive shaft means having an engine interposed therein, also a pair of transmissions and a pair of associated free-wheeling units on said shaft means, one transmission and one unit being positioned between each end of the engine and the corresponding differential, thereby providing an improved four wheel drive with modern features in present day automobiles, and also obviating any necessity of the heretofore customary intermediate differential or third differential needed in the known four wheel driving mechanisms.

A further object is to provide a four wheel driving mechanism of this type with a novel gear shift which operates both transmissions in unison for simultaneously shifting them to either of the several operative positions.

These and various other objects and advantages will become apparent from the following description, taken in connection with the accompanying drawings, in which the invention is illustrated in its preferred forms of construction, it being understood that various other arrangements and forms of construction may be resorted to for carrying out the objects and purposes of this invention.

In the drawings:

Fig. 1 is a plan view of an automobile chassis equipped with my present invention.

Fig. 2 is a side elevational view of the control means for operating the two transmissions in unison.

Fig. 3 is a longitudinal vertical sectional view taken substantially on line 3—3 of Fig. 1.

Fig. 4 is an end elevational view of the control means, partly in section, taken on line 4—4 of Fig. 3.

The present invention pertains to a mechanical four wheel driving mechanism, and is shown in the drawings as applied to the chassis of an automobile or motor vehicle including the pair of front wheels W, and pair of rear wheels W', which are driven by the front and rear driving axles or transverse shaft means A and A', which in turn are actuated by the front and rear differentials D and D', positioned in their respective differential housings. Said front and rear pairs of wheels and associated members are connected by the frame bars F and springs S thereon, in the usual manner.

The alined drive shaft means 10 utilized in the present invention, extends to and is connected with the front and rear differentials D and D'. It includes the rear propeller shaft 11 which has universal connection with the stub shaft or shaft portion 12 extending from the rear differential D', and includes the shaft portion or member 13 extending from the front differential D, for operating the two differentials together.

The prime mover in this four wheel driving mechanism is preferably in the form of an internal combustion engine or gasoline engine E, which is interposed in the forward part of said alined drive shaft means 10, substantially midway between said shaft members 11 and 13. A front transmission 16 and a rear transmission 16' are respectively interposed in said shaft means 10, between the front end of the engine and the front differential, and the rear end of the engine and the rear differential, preferably in the positions shown in the drawings. A front clutch mechanism 17 and a rear clutch mechanism 17' are also positioned on shaft means 10, between the ends of the engine and the pair of transmissions 16 and 16', being preferably connected with the ends of the transmissions adjacent the engine, substantially as indicated.

This four wheel driving mechanism is also provided with a pair of free-wheeling units, comprising a front free-wheeling unit 18 and a rear free-wheeling unit 18' which are associated with the pair of transmissions 16 and 16'; and in the present form of invention illustrated herein the rear free-wheeling unit 18' is a standard free-wheeling unit which can be changed in the usual manner, so that under normal conditions it can be used for conventional driving, and can also be used for unconventional driving. It is therefore mounted in the rear transmission 16', like in any present day automobile, and has universal connection with the rear propeller shaft 11. The front unit 18 is positioned rearwardly of the front transmission 16, and it is preferably placed adjacent the front of engine E, between it and the front clutch mechanism. This front unit 18 thus constantly functions as a free-wheeling unit.

Control means is provided for operating the transmission 16 and 16' in unison, and this means comprises a pair of shift levers or shafts 20 and 20' which take the place of the ordinary shift levers and have straight upper stem portions extending from the upper parts 21 and 21' of the transmission mechanism 16 and 16'; and a pair of partly hollow shafts or sleeves 22 and 22' wherein the upper ends of said shafts 20 and 20' are slidably movable, each sleeve having a spring 23 therein to urge said sleeve upwards on the shaft. A horizontal connecting shaft 24 is journalled in bracket members 25 arising from engine E and is provided with a front arm 26 and a rear arm 26', each having a knob 27, 27', at the end engaging in a front socket 28 and in a rear socket 28' provided on sleeves 22 and 22' respectively, to actuate the same. A lever or handle 29 extends upwardly from the rear end of shaft 24, for manually actuating or turning the same, whereby to swing arms 26 and 26' sideways, thus turning the knobs in the sockets and swinging or tilting sleeves 22 and 22' sideways, substantially as indicated in Fig. 4, so as to move the shift lever 20 to the various positions required in shifting the gears. Handle 29 with shaft 24 is likewise moved forwardly and rearwardly to move sleeves 22 and 22' and shift levers 20 and 20' forwardly and rearwardly, for the purpose of shifting the gears into the various positions of speed that are usually provided with automobiles and vehicles of this kind. Spring 23 serves to slide sleeve 22 on shaft 20 and keep knob 28 in socket 29 during the tilting operation thereof. This control means thus provides for shifting the levers 20 and 20', and thereby the transmissions in unison, into the particular position desired.

Means is also provided for operating the front and rear clutch mechanisms 17 and 17' in unison, which includes a pair of lever arms 30 and 30' extending from the clutch mechanisms 17 and 17', similar to the usual clutch control levers for operating them in the usual manner. A connecting rod 31 connects said arms 30 and 30', and a pedal 32 is provided on arm 30' for actuating said arms and therethrough the clutches in unison.

The fan means herein preferably includes a pair of fans 33 mounted at the front of the engine, the same being driven by a belt or flexible member 34 which travels over a pair of pulleys 35 connected with the fan shafts, and a pulley 36 connected with the engine shaft and being preferably positioned on the front end of the engine and the rear part of front free-wheeling unit 18, substantially as indicated in the drawings.

The means for cranking the engine in this invention preferably comprises a gear 38 actuated by a shaft 39 journalled in suitable bearing means 40 provided beneath the housing means of the front part of the driving mechanism, and a ring gear 41 mounted on said alined drive shaft means on the forward part of free-wheeling unit 18, said gear 41 being actuated by the gear 38. This engine cranking means is more fully disclosed and claimed in applicant's prior application for patent for engine cranking mechanism, Serial Number 542,780, filed June 8, 1931, now Patent No. 1,892,343 dated December 27, 1932.

This improved four wheel driving mechanism has all the main drive shaft parts, and likewise the axes of the driving mechanisms, all arranged in alinement as one alined drive shaft mechanism. It also includes the modern free-wheeling units, in conjunction with the pair of transmissions; and hereby the free-wheeling units serve to compensate for any variation in the speed of travel that may occur between the front pair of wheels and the rear pair of wheels, as when the vehicle is making a short turn or going on a curved path. Furthermore, the two transmissions can be operated in unison, no third intermediate differential being required, as is customary with the several prior constructions.

I claim as my invention:

1. In an automobile having a pair of front and a pair of rear wheels also front and rear standard differentials to operate the same, alined drive shaft means having its two ends operatively connected to the two differentials, and driving means on said shaft means including an engine thereon also a transmission including change speed gearing positioned between each differential and the adjacent end of the engine, a free-wheeling unit associated with each transmission, and a mechanical clutch positioned between each transmission and the engine.

2. The subject matter of claim 1 and including lever control means for operating said transmissions in unison also an actuating member for each clutch and means for connecting said members and operating the same in unison.

3. In an automobile having a pair of front and a pair of rear wheels, a differential for each pair of wheels, alined drive shaft means having its two ends operatively connected to the differentials, a driving engine interposed in said shaft means, a transmission including change speed gearing between each differential and the adjacent end of the engine, a clutch mechanism between each transmission and the adjacent end of the engine, control means for operating said clutch mechanism in unison to function together for driving the automobile, and other control means including a shift lever on each transmission and an operating shaft with means for connecting the same to said levers to operate the transmissions in unison.

4. The subject matter of claim 3 and including a free-wheeling unit which is constantly free-wheeling connected to the front end of the engine, and a conventional lockable free-wheeling unit provided in the rear transmission.

5. In an automobile having a pair of front and a pair of rear wheels also front and rear differentials for operating the same, means for driving the differentials including shaft means having its ends connected with said differentials and carrying an engine thereon, two transmissions positioned adjacent the ends of the engine, a free-wheeling unit associated with each transmission, and control means for operating said transmissions simultaneously including a shift lever arising from each transmission, a member having slidable connection with each lever, a control shaft and handle thereon for manually operating it, and arms on said shaft with co-acting means on said arms and said slidable members whereby to tilt said shift levers for operating them in unison laterally and longitudinally of the automobile.

6. In an automobile having a pair of front wheels and a pair of rear wheels, four-wheel-driving means therefor comprising a differential for each pair of wheels, alined drive shaft means having its two ends operatively connected to said differentials, a driving engine interposed in said shaft means, two transmissions on said shaft means adjacent the two ends of the engine, a mechanical clutch between each transmission and the adjacent end of the engine, a free-wheeling unit connected to the front end of the engine, which is adapted to be constantly free-wheeling when the front wheels turn faster than the engine, a conventional lockable free-wheeling unit connected to the rear transmission, lever control means for operating said clutches in unison to function together for driving the automobile, and other control means including a shift lever on each transmission and an operating shaft with means for connecting the same to said levers to operate them and the transmissions in unison.

BROR G. JOHNSON.